United States Patent [19]

Sharpe

[11] 4,123,072

[45] Oct. 31, 1978

[54] PISTON RING ASSEMBLY AND METHOD OF MAKING SAME

[75] Inventor: Robert L. Sharpe, Richmond, Ind.

[73] Assignee: Dana Corporation, Toledo, Ohio

[21] Appl. No.: 779,281

[22] Filed: Mar. 18, 1977

[51] Int. Cl.² .............................. F02F 5/00; F16J 9/20
[52] U.S. Cl. ...................................... 277/216; 277/171
[58] Field of Search ................ 277/168, 172, 216, 222

[56] References Cited

U.S. PATENT DOCUMENTS 1,428,552  9/1922  Mulleln ................................ 277/222
3,554,564  1/1971  Lassanske ............................ 277/176

Primary Examiner—Robert I. Smith
Attorney, Agent, or Firm—Donald R. Fraser

[57] ABSTRACT

A piston and piston ring assembly wherein the piston is provided with a piston ring receiving groove having at least one inwardly converging side wall and an associated piston ring loosely received within the grove wherein the piston ring has at least one inwardly converging side wall of curved cross-section in facing relation with the inwardly converging side wall of the groove of the piston.

7 Claims, 6 Drawing Figures

PISTON RING ASSEMBLY AND METHOD OF MAKING SAME

BACKGROUND OF THE INVENTION

1. Field of the Invention

The invention broadly relates to keystone type piston ring structures which are typically employed as compression rings in engines and utilized in a wide variety of engine applications. The objective of the structure is to effect a seal in the space between an associated piston and liner to prevent the high-pressure combustion gases or the air charge from escaping down the liner during the compression or power strokes; to transmit heat energy from the piston to the cooled cylinder liner; and to absorb a certain part of the fluctuations of the piston side thrust.

2. Description of the Prior Art

Some internal combustion engines have compression rings with the bottom wall or both the bottom and top walls beveled, making the ring thinner at the inside than at the outside diameter. The associated groove in the piston for receiving the ring is machined to the same general shape. The gas pressure acting on the top wall of the ring owing to the bevelled bottom surface, produces an additional force pressing the ring outwardly against the cylinder wall and helping to adequately effect the desired seal.

On the other hand, at each reversal of the side thrust of the piston, the ring slides slightly into the associated groove, is pressed against the upper groove wall, crushes the carbon which is deposited on it, and keeps the ring from sticking.

It is an objective of the present invention to produce a piston ring structure for a fluid pressure system wherein the sealing relationship of the ring and the associated piston is improved to effect a gas-tight seal.

It is another object of the invention to produce a piston ring structure wherein line-to-line contact is achieved between the piston ring and the peripheral groove in the associated piston to prevent combustion gases, for example, in an internal combusion engine from passing to the crankcase, and oil from passing to the combustion chamber in excess quantities.

Still another object of the invention is to produce a piston ring structure wherein at least one wall thereof is inclined inwardly and of a curved cross-section to thereby cooperate with a suitably shaped groove in an associated piston to effect a line-to-line contact between the curved surface of the ring and the outer edge of the groove in the piston.

Another object of the invention is to produce a piston ring having at least one inwardly inclined wall of curved cross-section which may be readily and economically manufactured.

A further object of the invention is to produce a method of making a piston ring having at least one inwardly machined wall of a curved cross-section.

The above, as well as other objects of the invention are typically achieved by a piston and piston ring assembly for a fluid pressure cylinder comprising a piston having a peripheral groove formed therein having at least one inwardly converging wall, and a piston ring having at least one inwardly converging wall of a curved cross-section, the piston ring being loosely received within the peripheral groove of the piston with the inwardly converging wall in facing relation to the inwardly converging wall of the groove of the piston.

BRIEF DESCRIPTION OF THE DRAWINGS

Other objects and advantages of the invention will become clearly apparent to those skilled in the art from reading the following detailed description of an embodiment of invention when considered in the light of the accompanying drawings, in which.

DETAILED DESCRIPTION OF EMBODIMENTS OF THE INVENTION

The present invention relates to piston rings which are self-tensioned annular metal pieces installed in piston grooves to provide a moveable seal between the combustion chamber and the crankcase of an internal combustion engine.

The metal used for manipulating piston rings must meet a number of requirements. The metal must be a good bearing material and have a low rate of wear. In certain instances, the metal of the ring will be coated with a material having such properties. The metal additionally should be suitably hard and of high strength, yet readily machinable. It must be a good spring material and resistant to fatigue. Ring materials must be able to operate under conditions of boundary lubrication while carrying high loads. The metal must substantially retain its mechanical strength while working at elevated temperatures and pressures in the associated engine. Also, the hot corrosive products of combustion should not have an extremely adverse effect on the wearing qualities and properties of the metal of the rings.

To reduce the wear of piston rings and impart desirable characteristics thereto, a number of coatings and platings may be applied.

Some types of special facings, such as for example a thin bearing surface of antifriction metal or chemical treatment, facilitate the run-in or seating of new rings. Such facings may cause tiny rough spots on the surfaces of the rings and the associated cylinder liner to wear off gradually, so that good surface to surface contact is achieved without excess friction which might cause scuffing or scarring.

All of the various desirable characteristics of the material of the piston rings cooperate to cause the piston rings to provide an operative moving seal preventing combustion gases from passing to the crankcase and oil from passing to the combustion chamber in excess quantities. This dual function has led to the development over the years of two basic piston ring types - compression rings and oil rings. Within these broad categories, hundreds of different design variations have been developed. Typically, rings of proper design are combined into sets to provide the best and optimum performance for each engine under all operating conditions.

Figure 1:
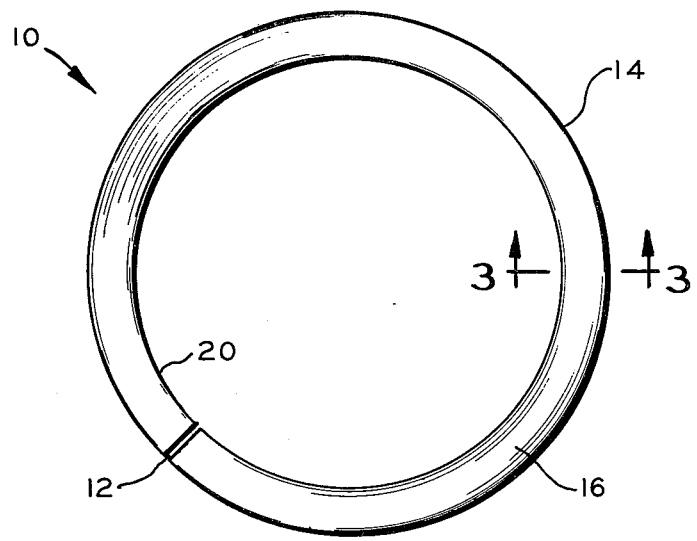
FIG. 1 is a top plan view of a piston ring incorporating the salient features of the present invention.
Figure 2:
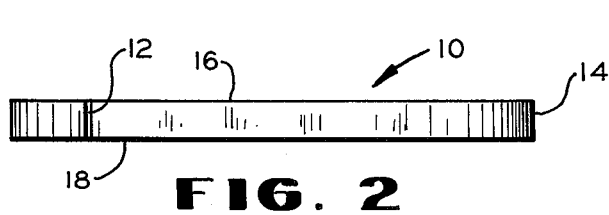
FIG. 2 is a front view of the piston ring illustrated in FIG. 1.
Figure 3:
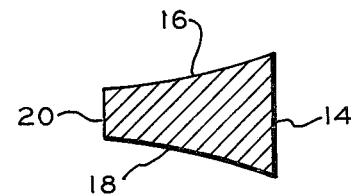
FIG. 3 is a sectional view of the piston ring illustrated in FIGS. 1 and 2 taken along line 3—3 of FIG. 1.
Figure 4:
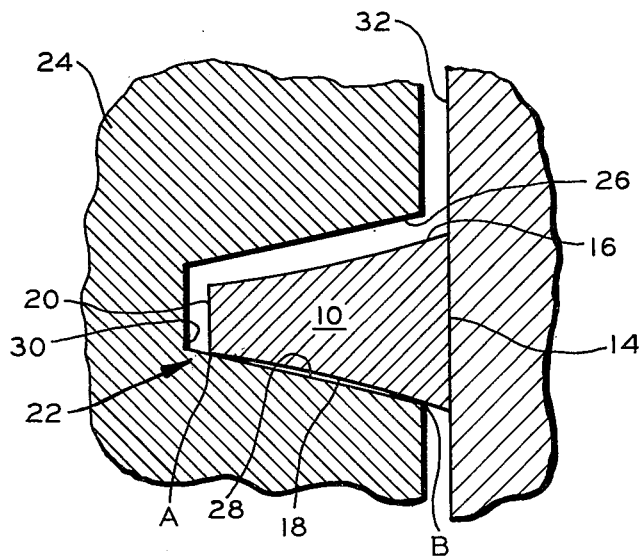
FIG. 4 is an enlarged fragmentary sectional view of the piston ring illustrated in FIGS. 1 and 2 in use within a groove of an associated piston.

Referring to FIGS. 1, 2, 3 and 4, there is shown a piston ring 10, embodying the features of the present invention, having a gap 12. The ring 10 is typically referred to as a keystone-type piston ring having an outer peripheral wall 14 often referred to as the piston ring face; and inwardly converging top wall 16; and inwardly converging bottom wall 18, and an inner wall 20. The top wall 16 and the bottom wall 18 are formed to assume a slightly concave cross-sectional configuration, as is more clearly apparent in FIG. 4 wherein the piston ring 10 is shown as being received in a groove 22 formed in the peripheral side wall of an associated piston 24. The groove 22 is defined by an inwardly converging top wall 26, an inwardly converging bottom wall 28, and a rear wall 30. The piston 24 is adapted to reciprocate within a cylinder defined by a cylinder wall 32. The diameter of the ring 10, when free, is typically slightly larger than the cylinder bore; consequently, when the ring is squeezed into the cylinder, it presses against the cylinder wall 32 of the engine and tends to effect a seal. This initial sealing action is greatly improved in operation by the pressure of the engine during the power stroke, as illustrated in FIG. 4 (which exaggerates the clearances for the sake of clarity). The pressure of the compression air or of the compression gases against the top surface 16 of the ring 10 forces the ring downwardly on the lower side 28 of the peripheral groove 22 of the associated piston 24, tending to cam the ring 10 radially outwardly. This leaves a clearance at the top side 16 of the ring permitting the gas pressure to travel behind the back wall 20 of the ring. This gas pressure, in turn, acting on the back wall 20 of the ring additionally forces the ring outwardly into firmer contact with the cylinder wall 32. When there is little or no gas pressure to be sealed, the ring is free in the groove 22 and its own tension creates only a light pressure against the cylinder wall 32, causing minimum friction and wear; but when the gas pressure increases, the ring is caused to press correspondingly tighter both against the cylinder wall 32 and against the piston groove 22, thus cooperating to improve the seal and reduce the leakage, resulting in a more efficient and pollution-free engine.

It has been found that the curved cross-sectional configuration of the top wall 16 and the bottom wall 18 of the ring 10 has produced an operative piston ring having improved sealing characteristics and thus improved operating characteristics of the engine. By reason of the curved configuration of the upper and lower surfaces of the piston ring, line-to-line contact is achieved between one of the inwardly converging top or bottom walls of the piston ring and the facing wall of the groove. Specifically, FIG. 4 shows the piston and piston ring assembly during the power stroke of the engine wherein the pressure of the combustion gases is instantaneously applied to the top wall 16 and the rear wall 20 of the ring providing an outward pressure component tending to hold the ring face 14 in sealing relation with respect to the cylinder wall 32. It will be appreciated that as the above forces act on the ring 10, the lower wall 18 of the ring tends to be cammed outwardly along the inclined wall 28 of the groove 22. Manifestly, this action tends to create and maintain a sealing relation between the ring face 14 and the cylinder wall 32. However, during this same time period the lower surface 18 of the ring has established a line-to-line contact with the lower surface 28 of the groove 22 at the bottom of the wall 20 of the ring as at A and at the outermost edge of the lower wall 28 of the groove 22 as at B. Thus, the vertical forces tending to push the ring 10 into sealing relation with the groove 22 are concentrated along the line-to-line contacts A and B. It has been found that even during the run-in period for new rings, the configuration has resulted in improved operating characteristics. More specifically, the oil consumption and amount of blowby has been materially decreased through the use of piston rings fabricated in accordance with the above description.

Figure 5:
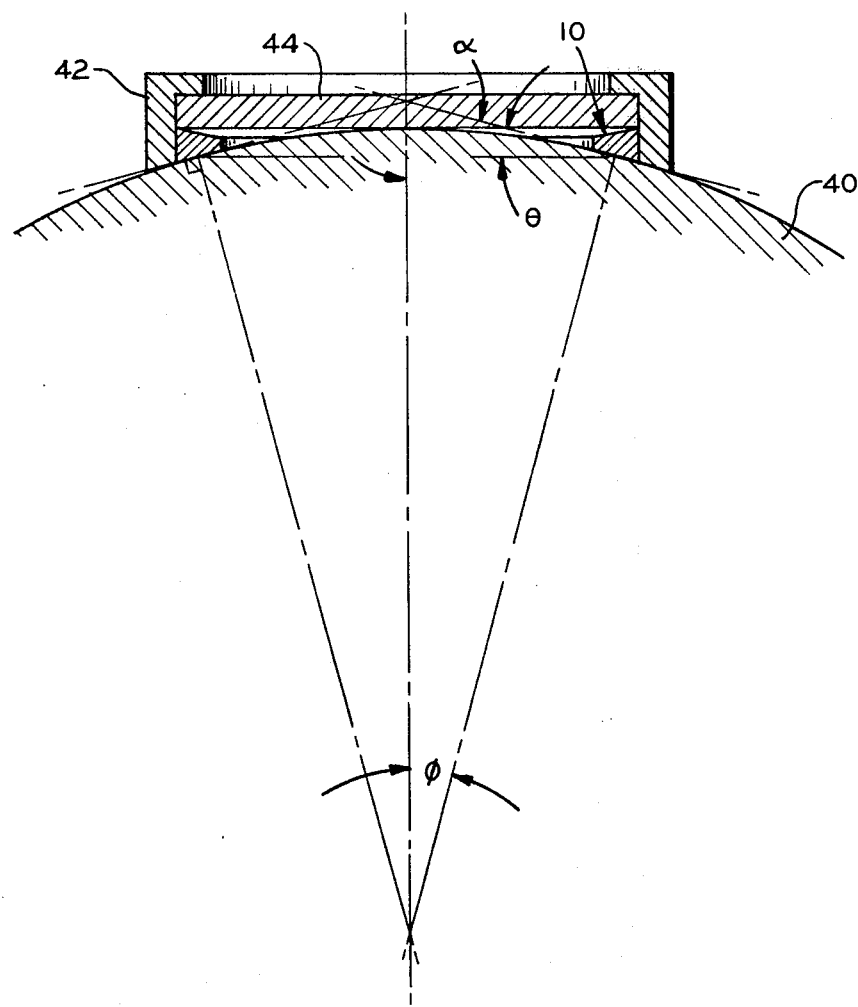
FIG. 5 is a schematic illustration of a system for achieving the top or bottom wall configuration of the piston ring illustrated in FIGS. 1 through 4.
Figure 6:
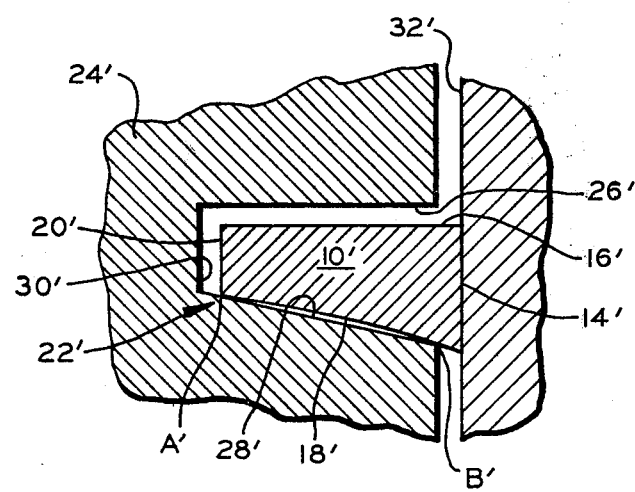
FIG. 6 is an enlarged fragmentary sectional view of a modified form of the piston and piston ring assembly illustrated in FIGS. 1, 2, 3 and 4.

The technique for finishing the top wall 16 and bottom wall 18 of the ring 10 is accomplished by the apparatus schematically illustrated in FIG. 5. The apparatus consists basically of a rotating lapping sphere 40 the peripheral surface of which is coated with abrasive particles. The piston ring 10 being finished is suitably contained within an annular confining member 42. A disc shaped hold down plate 44 having a diameter slightly less than the inside diameter of the confirming member 42 is employed to apply substantially equal downward pressure to the top wall 16 of the ring 10 to thereby cause the bottom wall 18 of the ring to contact the spherical peripheral surface of the lapping sphere 40. As the lapping sphere 40 is caused to rotate about its axis, the abrasive particles carried thereby effectively form a concave surface on the bottom wall 18 of the contained ring 10. When the desired surface configuration and smoothness is achieved, the ring 10 is turned over so that the opposite wall 16 is brought into contact with the spherical abrasive surface to achieve the desired concave surface. In order to determine the radius of the lapping sphere 40 to be used for a given ring, the following method has been successfully utilized $\alpha = 180 - 90 - \theta = 90 - \theta$
$\phi = 180 - 90 - \alpha = 90 - \alpha$
$\phi = 90 - (90 - \theta) = \theta$
$\phi =$
$\sin \theta = A/R$ or $R = A/\sin \theta$
Since $\phi = \theta$
Therefore $R = A/\sin \theta$
Where $A$ = (Ring Diameter - Ring Wall)/2 and $\theta$ = Keystone Angle FIG. 6 shows an embodiment of the invention similar to that illustrated in the embodiment of FIGS. 1 through 5, inclusive, but the piston ring 10' includes only a single inwardly converging surface. In this particular embodiment of FIG. 6, the top wall 16' is flat and generally perpendicular to the ring face 14'. The ring 10 includes a rear wall 20' which is generally parallel to the ring face 14', and an inwardly converging bottom wall 18'. The associated groove 22' of the piston 24' is formed with an interior configuration similar to the cross-sectional configuration of the ring 10'. More specifically, the groove 22' includes a top wall 26' which is generally flat, an inwardly converging bottom wall 28', and a flat rear wall 30'. As in the previously described embodiment, the sealing action of the piston ring 10' is improved, in operation, by the pressure of the engine gases. During the power stroke, for example, the pressure of the compression gases against the top wall 16' of the ring 10' forces the ring downwardly on the lower wall 28' of the groove 22' of the piston 24', tending to cam the ring 10' radially outward. This action leaves a clearance at the top side 16' of the ring 10', permitting the gas pressure to travel behind the rear wall 20' which acts to additionally urge the ring 10' to expand radially outwardly against the cylinder wall 32'.

As in the earlier described embodiment, improved sealing characteristics and operating characteristics are achieved by reason of the curved configuration of the bottom wall 18'. This line-to-line contact established between the curved bottom wall 18' of the ring 10' and the bottom wall 28' of the associated groove 22' as at A' and B' in FIG. 6 has resulted in improved operating characteristics.

Another embodiment of the invention which is not as preferable as the previously described embodiment, contemplates a piston ring structure having at least one inwardly converging wall formed to have a slightly convex cross-sectional configuration. The associated groove of the piston adapted to receive the ring would be defined by an inwardly converging facing wall.

As in the previously described embodiments, the sealing action of the piston ring is improved by reason of the curved configuration of the ring surface as it contacts the respective groove surface.

As described with respect to each of the embodiments of the invention, the novel design of the piston ring results in line-to-line contact between the facing surfaces of the piston rings and the respective facing surface of the peripheral groove formed in the piston. These line-to-line contacts are preferably radially spaced from one another and typically are spaced apart over a substantial portion of the entire width of the upper and lower sealing surfaces of the piston ring. Also, it will be appreciated that, in operation the forces applied against the one ring surface by the combustion gases, for example, will actually be concentrated at the opposite surface of the ring and are applied in the concentrated form to the adjacent groove surface along the two spaced apart line-to-line contacts as is clearly illustrated in FIGS. 4 and 6.

What is claimed is:

1. A piston and piston ring assembly for a fluid pressure cylinder comprising:

a piston with a peripheral groove having at least one inwardly converging side wall; and a piston ring having an outer peripheral wall, an inner peripheral wall having an axial dimension less than the outer wall, and at least one wall tending to inwardly converge from the outer wall to the inner wall, said piston ring being loosely received within the peripheral groove of said piston with the inwardly converging wall in facing relation to the inwardly converging wall of the groove of said a piston, wherein at least one of the inwardly converging walls of said piston and said piston ring is of concavely curved cross-section over a major portion of the wall thereof so as to establish line-to-line contact between the facing wall.

2. The invention defined in claim 1 wherein the inwardly converging wall of said piston ring is curved in cross-section.

3. The invention defined in claim 2 wherein the curved cross-section is concave.

4. The invention defined in claim 1 wherein the line-to-line contact is comprised of two spaced apart line contacts.

5. The invention defined in claim 4 wherein the line contacts are generally annular and are radially spaced apart.

6. The invention defined in claim 1 wherein the peripheral groove in said piston has two inwardly converging side walls in facing relation, and said piston ring has two inwardly converging walls in facing relation to respective ones of the side walls of the groove of said piston.

7. A piston ring for a pheripheral groove of an associated piston of a fluid pressure cylinder comprising a split annulus having an outer peripheral wall, an inner peripheral wall having an axial dimension less than the outer wall, and at least one wall tending to inwardly converge from the outer wall to the inner wall of concavely curved cross-section over a major portion of the wall thereof.

* * * * *